Nov. 22, 1966  W. S. TUCKER  3,287,071
MOLDED BEARING ASSEMBLY AND METHOD OF MAKING SAME
Filed July 28, 1965  2 Sheets-Sheet 1

INVENTOR.
WILLIAM S. TUCKER
BY
ATTORNEYS

Nov. 22, 1966  W. S. TUCKER  3,287,071
MOLDED BEARING ASSEMBLY AND METHOD OF MAKING SAME
Filed July 28, 1965  2 Sheets-Sheet 2
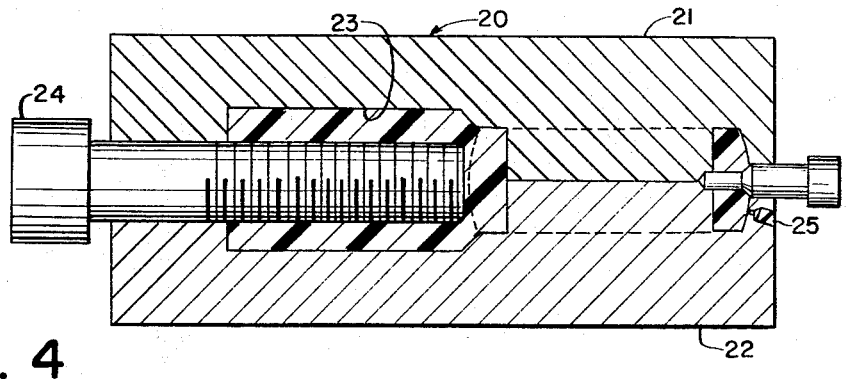
FIG. 4
FIG. 5
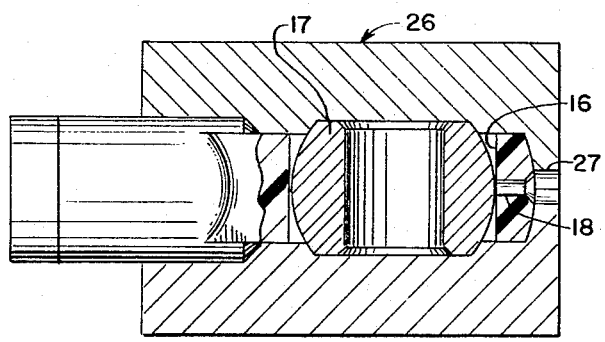
FIG. 6
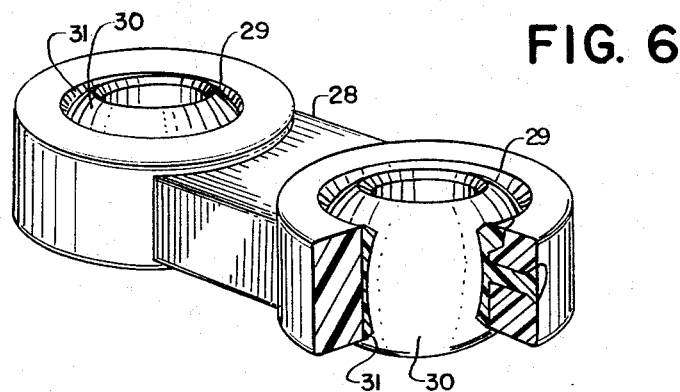
INVENTOR.
BY

2

United States Patent Office 3,287,071
Patented Nov. 22, 1966

3,287,071
MOLDED BEARING ASSEMBLY AND METHOD
OF MAKING SAME
William S. Tucker, Canaan, N.H., assignor to Miniature Precision Bearings, Inc., Keene, N.H., a corporation of New Hampshire
Filed July 28, 1965, Ser. No. 475,453
12 Claims. (Cl. 308—72)

This application is a continuation-in-part of my copending application, Serial No. 433,532, and now abandoned, filed February 2, 1965 which is, in turn, a continuation of my application, Serial No. 215,222 filed August 1, 1962, now abandoned, which is, in turn, a continuation-in-part of my application, Serial No. 132,470 filed August 18, 1961, now abandoned.

This invention relates to a molded bearing assembly and more particularly to a spherical bearing assembly having a unitary molded outer race of minimum thickness disposed within a rigid undeformed housing. The race is formed from a low shrink plastic; and in its "as molded" condition, is in unstressed line-to-line rotative engagement with the inner bearing member and non-rotative engagement with the housing.

In manufacturing a bearing assembly comprised of an inner metallic bearing member and an outer plastic race, it is desirable that the inner bearing member be freely rotatable within the plastic race with a minimum amount of looseness. Also, where an outer housing encloses the race of the assembly, it is also desirable that the race be in tight engagement with the housing and secured against movement with respect to it. In the past, attempts have been made to produce bearing assemblies having these characteristics; however, such assemblies have not been altogether satisfactory because of certain inherent characteristics of the pastic employed for the race and because of the particular procedures used in molding the race about the inner bearing member.

In using a thermoplastic or thermosetting plastic material for producing the outer race, the plastic material, in a molten state, is conventionally injected under relatively high pressures, ranging from 10,000 to 25,000 pounds per square inch, into a mold carrying the inner bearing member. The plastic material, under the influence of this pressure, assumes a position surrounding the bearing surface of the inner bearing member; and due to this pressure, a stress is created in the plastic. When theh plastic sets, it forms the outer race of the assembly. During this setting of the plastic material, however, there is a natural tendency for it to shrink around the inner bearing member and this characteristic is amplified by the stress already created in the plastic material. This shrinkage, in turn, tends to cause a locking up of the formed race on the inner bearing member and this can prevent or at least severly interfere with the normal desired rotation of the bearing member within the race.

In order to avoid this undesirable result, various methods have been suggested to provide a positive clearance between the inner bearing member and the plastic race. For example, a thick parting compound may be applied to the outer surface of the inner bearing member before the molding of the plastic race therearound. After the plastic forming the race has set, the parting compound is removed to provide the desired clearance. With the removal of the parting compound, the stress in the plastic material will be relieved; however, the race will then be freed to shrink further into this clearance; and if the parting compound originally applied to the inner bearing member is not of sufficient thickness to compensate for this additional shrinkage, the race will again tend to lock onto the inner bearing member thereby proventing the desired free rotational relationship. Even if the parting compound is thick enough to fully compensate for the shrinkage of the plastic, the clearance that does exist cannot be precisely controlled to assure that the bearing surface of the plastic race is precisely complementary to the bearing surface of the inner bearing member. Upon subsequent rotation of the inner bearing member within the race during use of the assembly, the inner bearing member riding loose in the non-conforming race will tend to cause deterioration of the race and this is especially true where the assembly is subjected to uneven loading conditions.

Additional problems are encountered where the assembly is further provided with an outer housing member surrounding the plastic race. With this type of construction, shrinkage of the race will not only cause the race to tighten upon the inner bearing member but will also cause it to shrink away and thereby separate from the housing. Such a separation will free the race member for rotation within the housing itself and this will compound the undesirable characteristics already present due to the loose fit of the race about the inner bearing member. In addition, the bore of the housing in conventional bearing assemblies is not machined or finished to any bearing surface quality as is the outer surface of the inner bearing member. Accordingly, rotation of the plastic race within the housing will tend to cause rapid deterioration of the race member.

As an alternative to using a temporary parting compound for producing a clearance between the inner bearing member and the plastic race, attempts have been made to provide this clearance by axially deflecting the inner bearing member within the plastic race after the plastic has set. This procedure actually deforms the plastic race by elastically expanding it; and after the pressure exerted on the plastic by this axial displacement has been removed, the plastic will tend to contract elastically about the inner bearing member. Where this procedure is used to provide the clearance in an assembly which includes an outer housing surrounding the race, such housing is made of deformable material and is itself deformed upon axial displacement of the inner bearing member by the forces exerted on it through the plastic race. The deformable housing is necessary to permit the expansion of the race; however, housings of such construction have limited use. They cannot, for example, be used in situations where they are likely to be subjected to further deformation for this would cause further undetermined deformation of the race member. Also, where the clearance between the inner bearing member and the plastic race is produced by axially displacing the inner bearing member, the plastic race upon contracting elastically towards its original dimension after the pressure is relieved will not only tend to tighten around the inner bearing member but will also tend to separate from the outer housing. In addition, deformation of the plastic race member in this manner tends to weaken and reduce its effective load carrying capability.

A third alternative way suggested for creating a clearance between the inner bearing member and the plastic race involves the step of rotating the inner bearing member eccentrically within the forming mold as the plastic for the outer race is injected therein. With this technique, a clearance can be produced; however, it is difficult to control the degree of clearance to assure that the bearing surface of the race will be precisely complementary to the bearing surface of the inner bearing member. In addition, the positive clearance that is provided permits the inner bearing member to move eccentrically within the race during use of the assembly thus tending to further distort and damage the race member. Again, if the assembly is provided with an outer housing, shrinkage away from the housing will occur, and the positive spacing between the inner bearing member and the plastic race will permit the race to further shrink away from the housing wall and thus produce additional looseness in the assembly.

In accordance with the teaching of the present invention, a bearing assembly is constructed by techniques which require no separate steps for effecting a clearance between the inner bearing member and the plastic race. In the bearing assembly of the present invention, a positive clearance is avoided and the plastic race member in its originally molded condition is in substantially line-to-line rotative contact with the inner bearing member and there is substantially no tendency for the plastic to shrink and tighten about the inner bearing member. Accordingly, a locking up of the assembly or a separation of the plastic from the outer housing is avoided.

To produce a bearing assembly having these qualities, the plastic used for producing the race is a low shrink, maximum fill material; and as it is injected into the forming mold, it is maintained at a low pressure with the spacing between the inner bearing member and the outer housing being maintained at a value just sufficient to permit the introduction of the plastice material therein. When this low shrink plastic is injected into the clearance between the inner bearing member and housing under a temperature sufficient to liquefy the plastic and under a pressure maintained at a value just sufficient to completely fill the clearance, the race in the "as molded" condition will be in a relaxed or unstressed condition around the inner bearing member; and accordingly, the tendency of the race member to shrink around the inner bearing member is reduced to a minimum. Further, because of the thin cross-sectional dimension of the race member, any shrinking that might tend to occur becomes insignificant. The inner bearing member is thus free to turn with light pressure with no separate loosening operations being required. In this manner, the inner bearing member is more accurately positioned with respect to the race than with the prior constructions described above since no temporary parting compound and no deformation of the race or eccentric spinning of the inner bearing member is required. No degradation in the strength or structure of the plastic occurs and almost perfect conformity results between the inner bearing surface of the plastic race.

Referring to the drawings in which preferred embodiment of my invention are shown.

FIG. 4 is a cross-sectional view of the housing of the assembly shown in FIG. 3 disposed within its forming mold;

FIG. 5 is a cross-sectional view of the assembly shown in FIG. 3 together with the mold assembly used for molding the plastic race member; and FIG. 6 is a perspective view, partially in cross-section, of another embodiment of the present invention.

Figure 1:
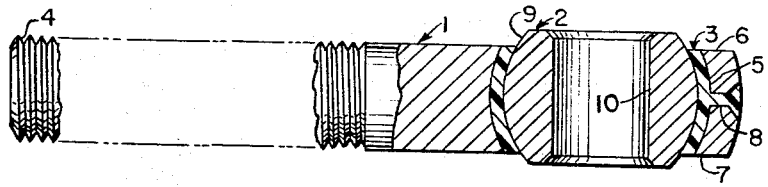
FIG. 1 is a cross-sectional view of a spherical bearing assembly constructed according to my invention.

Referring to the drawings, FIG. 1 illustrates a spherical bearing assembly constructed in accordance with the teaching of the present invention. This assembly is generally comprised of a housing 1, an inner bearing member 2, and an intermediate race 3. The housing is made of rigid, substantially non-deformable metal such as steel and provided with a threaded rod end 4. At the opposite end of the housing, a passageway 5 extends therethrough from the upper face 6 to the lower face 7. The openings defined by this passageway at the faces 6 and 7 of the housing are circular in shape while the wall surface defining the passageway intermediate the housing faces 6 and 7 defines a portion of a sphere. Extending radially through the housing and into the passageway is a filling orifice 8.

The inner spherical bearing member which may, for example, be made of a hardened metal or from a porous sintered metal powder has an outer spherical bearing surface 9. The inner bearing member protrudes beyond the faces 6 and 7 of the housing in order that it may be misaligned with the housing when, for example, another rod end, not shown, extends through the bore 10 of the inner bearing member. The outer dimension of the inner bearing member is, in accordance with the teachings of the present invention, substantially the same or only slightly less than the dimension of the openings defined in the housing at the opposite faces 6 and 7. With this construction, the diametrical clearance between the spherical wall of the passageway 5 and the outer surface of the inner bearing member is maintained at a minimum.

The plastic race 3 is positioned between the wall of the passageway 5 of the housing and the inner bearing member and is made from a low shrink, maximum fill material such as a 20% glass filled nylon manufactured by Fiberfill, Incorporated under the name of Nylafil G–3–20. This plastic material in its molten or liquefied state is injected into the clearance between the inner bearing member and housing through the filling orifice 8.

Figure 2:
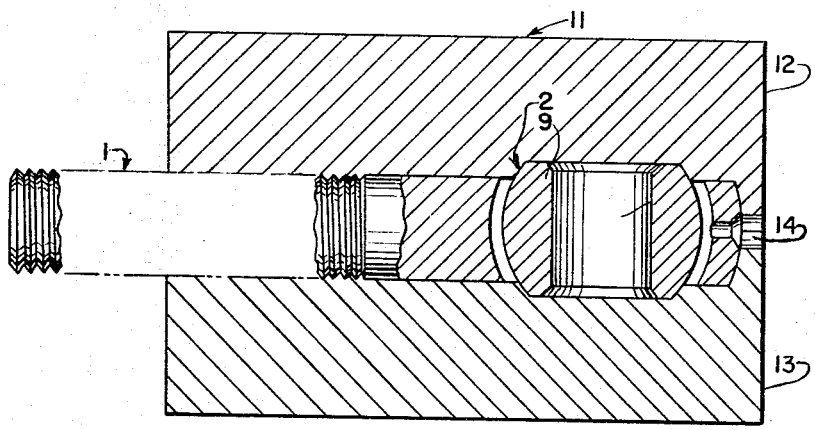
FIG. 2 is a cross-sectional view of the assembly shown in FIG. 1 illustrating the placement of its parts in a mold cavity.

FIG. 2 shows a forming mold 11 in which the housing and inner bearing member are poistioned during the injection of the molten plastic into the clearance between the two members. This mold is comprised of upper and lower halves 12 and 13, respectively, and is provided with a filling orifice 14. This orifice will be in alignment with the filling orifice 8 of the bearing housing 1 when the parts are positioned as shown in FIG. 2. In forming the outer race 3, the plastic is injected under minimum pressure which is just sufficient to fill the clearance yet low enough to prevent the creation of any stresses within the material which would otherwise cause it to shrink or tighten around the inner bearing member 2 and separate from the wall surface of the passageway 5 as it sets.

With a bearing assembly in which the outer dimension of the inner bearing member is about ¾ of an inch and where the plastic material used for forming the race is Nylafil G–3–20, the plastic will be injected under a pressure of about 1000 pounds per square inch or less, and with this pressure, the plastic will be maintained at a temperature of about 640° F. to permit it to flow completely around the bearing surface of the inner member. As compared to conventional molding techniques, this pressure is much lower. Conventional procedures inject the plastic at pressures ranging from 10,000 to 25,000 pounds per square inch.

Figure 3:
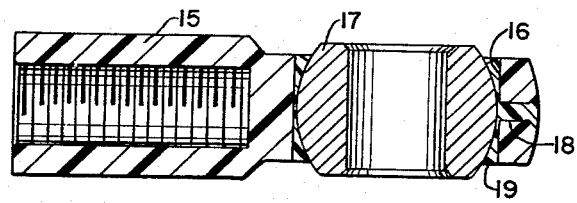
FIG. 3 is a cross-sectional view of a modified embodiment of the present invention.

FIG. 3 shows an alternative embodiment of the present invention in which the outer housing 15 is itself constructed of a plastic material. Specifically, the housing 15 is constructed from a high strength plastic such as a 40 glass filled nylon manufactured by Fiberfill, Incorporated under the name of Nylafil G–10–40. Also, like the housing 1 shown in FIG. 1, the plastic construction is substantially rigid and undeformable so as to prevent it from becoming misshapen during subsequent use of the assembly. The housing 15 is provided with a cylindrically shaped opening 16 for receiving an inner bearing member 17 and is also provided with a filling orifice 18 extending radially therethrough and into the opening 16. As with the bearing assembly of FIG. 1, the diametrical spacing or clearance between the inner bearing member and the wall surface of the opening 16 of the housing is maintained at a minimum controllable diameter. With an inner bearing member having an outer dimension of about ¾ of an inch, for example, the total diametrical clearance would be somewhat less than $\frac{1}{16}$ of an inch. The inner race 19 is formed from a separate plastic material such as Nylafil G–3–20 which is injected into the clearance at approximately the same pressure and temperature used in forming the assembly shown in FIG. 1. It is, of course, to be understood that with different plastic materials being used for the plastic race, the injection pressures and temperatures may vary somewhat. Nevertheless, in each case, the pressure would be maintained at a value just sufficient to cause the molten plastic to completely fill the clearance between the inner bearing member and the housing without creating any stresses in the plastic. As with the assembly of FIG. 1, the race 19 of the assembly having the plastic housing will be in an unstressed condition and in line-to-line rotative engagement with the inner bearing member in its "as molded" condition, and there will be substantially no tendency for the plastic to shrink onto the inner bearing member or away from the outer housing.

In forming the plastic housing 15, a forming mold 20, such as shown in FIG. 4, is used. This mold is provided with upper and lower halves 21 and 22, respectively, which when positioned as shown in FIG. 4, define a mold cavity 23 corresponding to the desired shape of the housing. An insert screw 24 is positioned in one end of the mold assembly so as to produce a housing assembly having an internally threaded rod end. A filling orifice 25 is provided at the righthand end of the mold assembly shown in FIG. 4 for injecting the plastic material into the mold cavity 23.

After the plastic housing has been formed, it is then placed in another mold assembly 26 such as shown in FIG. 5. This assembly also receives the inner bearing member 17; and the low shrink plastic material used for forming the race 19 is injected into the clearance between the inner bearing member and the housing through the filling orifice 27. As indictated above, the plastic material is injected at a pressure just sufficient to completely fill the clearance between the inner bearing member and the housing and at a sufficient temperature to maintain the plastic in a molten state. The incoming plastic will, upon contact with the wall surface of the opening 16, slightly melt the exposed plastic and thereby cause the inner race to become fused to the housing wall.

The assembly shown in FIGS. 3–5 possesses all of the essential qualities obtained with the metal housing assembly of FIG. 1. In addition, the use of a plastic housing reduces the total cost of the assembly and provides an assembly which is lightweight. Prior bearing assemblies have been constructed with a plastic housing; however, such housings have been molded directly about the inner bearing member with one cycle of plastic. Because of the heavy section of the plastic around the inner bearing member, such plastic tends to have a high degree of shrinkage around the inner bearing member causing it to lock up and prevent the desired rotation of the bearing. In order to permit rotation of the inner bearing member, conventional procedures, as indicated above, resort to techniques that produce a positive clearance. This secondary operation is not only expensive but as already explained, does not assuredly control the clearance to the level necessary for many critical applications.

FIG. 6 shows still another modified embodiment of the present invention in which the assembly is comprised of an outer plastic housing 28 in the form of a linkage. At both ends of this housing, openings 29 are provided for receiving spherical bearing members 30. As with the construction of FIG. 3, the housing 28 is molded in an initial operation and the plastic races thereafter molded directly within the openings 29.

It will be noted that in each of the bearing assemblies described above, the plastic race in its "as molded" condition is in line-to-line rotative engagement with the inner bearing member and in non-rotative engagement with the wall surface of the housing opening. The plastic material of the race extending into the filling orifice provided in the housing assures against the race rotating within the housing. Alternatively, the wall of the housing opening may be provided with groovings to prevent rotation of the formed race. Also, it is to be understood that various other changes may be made to the particular constructions of the assemblies shown without departing from the scope of the invention as set out in the following claims.

I claim:
1. A bearing assembly comprising:
 (a) a rigid undeformed housing having a wall surface defining an opening therethrough;
 (b) an inner bearing member disposed within said opening and spaced from said housing with a minimum degree of diametrical clearance; and
 (c) an undeformed, one-piece race of low shrink plastic material molded under relatively low pressure directly within the opening of said housing and in its as molded condition being in unstressed line-to-line, rotatable circumferential engagement with said inner bearing member and in non-rotative engagement with the wall surface of said opening.
2. A bearing assembly comprising:
 (a) a rigid undeformed housing of an integral one-piece plastic material having a wall surface defining an opening therethrough;
 (b) an inner bearing member disposed within said opening and spaced from said housing with a minimum degree of diametrical clearance; and
 (c) an undeformed, one-piece race of low shrink plastic material molded directly within the opening of said housing and in its as molded condition being in unstressed line-to-line rotatable engagement with said inner bearing member and in non-rotative fused engagement with the wall surface of said opening.
3. A bearing assembly according to claim 2 wherein:
 (a) the bearing surface of said inner bearing member defines a portion of a sphere; and
 (b) the opening in said housing is cylindrical in shape.
4. A spherical bearing assembly comprising:
 (a) a rigid, undeformed housing having two spaced outer faces and a passageway extending therethrough from one face to the other, said passageway defining a first circular opening of predetermined diameter at said one face and a second circular opening of a diameter no greater than said predetermined diameter at the other face, said passageway having a cross-sectional diameter intermediate said faces greater than the diameter of said first opening;
 (b) an inner spherical bearing member at least partially disposed in said passageway and having an outer diameter permitting movement through said first opening with a minimum degree of clearance; and
 (c) an undeformed, one-piece race of low shrink plastic material molded under relatively low pressure directly within the opening of said housing and in its as molded condition being in unstressed line-to-line, rotatable circumferential engagement with said inner bearing member and in non-rotative engagement with the wall surface of said opening.
5. A spherical bearing assembly according to claim 4 wherein:
 (a) the wall surface of the passageway in said housing defines a portion of a sphere generated about the center of said inner bearing member disposed concentrically therein.
6. A spherical bearing assembly according to claim 5 wherein:
 (a) said housing has a filling orifice extending therethrough and into said passageway; and
 (b) a portion of the plastic defining said race is disposed within said orifice.
7. A spherical rod end bearing assembly comprising:
 (a) a rigid, undeformed rod end housing having a cylindrically shaped wall surface defining an opening therethrough and a filling orifice extending through said housing and into said opening;
 (b) an inner spherical bearing member disposed within said opening and spaced from said housing with a diametrical clearance of less than about 1/16 of an inch; and
 (c) an undeformed, one-piece race of low shrink plas- tic material molded under relatively low pressure directly within the opening of said housing and in its as molded condition being in unstressed line-to-line, rotatable circumferentially engagement with said inner bearing member and in non-rotative engagement with the wall surface of said opening, said race having a portion thereof extending into said filling orifice.

8. A spherical bearing assembly comprising:
(a) a rigid, undeformed plastic housing having a cylindrically shaped wall surface defining an opening therethrough;
(b) an inner spherical bearing member disposed within said opening and spaced from said housing with a diametrical clearance of less than about 1/16 of an inch; and
(c) an undeformed, one-piece race of low shrink plastic material molded directly within the opening of said housing and in its as molded condition being in unstressed line-to-line, rotatable engagement with said inner bearing member and in fused engagement with the wall surface of said housing.

9. The method of manufacturing a bearing assembly having an inner bearing member and an outer rigid, undeformed housing with an opening extending therethrough, wherein the difference between the outer dimension of the inner bearing member and the cross-sectional dimension of said opening provides a minimum amount of clearance permitting filling of said clearance with a plastic material in unstressed condition, comprising the steps of:
(a) placing said inner bearing member within said opening in spaced concentric relationship therewith;
(b) admitting a heated, liquefied, low shrink plastic material into the clearance between said inner bearing member and said housing at a predetermined temperature sufficient to liquefy said plastic material and at a pressure just sufficient to fill said clearance with said plastic material in a substantially unstressed condition at said predetermined temperature; and
(c) allowing said plastic material to set to form a race for said inner bearing member.

10. The method of manufacturing a spherical bearing assembly having an inner spherical bearing member and an outer rigid, undeformed housing with two spaced outer faces and a passageway extending therethrough from one face to the other, said passageway defining a first circular opening of predetermined diameter at said one face permitting movement therethrough of said inner bearing member with a minimum degree of clearance and a second opening of a diameter no greater than said predetermined diameter at the other face, said passageway further having a wall surface defining a portion of a sphere and said housing having a filling orifice extending therethrough and into said passageway, comprising the steps of:
(a) placing inner bearing member concentrically within said passageway;
(b) admitting a heated, liquefied low shrink plastic material through said filling orifice and into the clearance between said inner bearing member and said housing at a predetermined temperature sufficient to liquefy said plastic material and at a pressure just sufficient to fill said clearance with said plastic material in a substantially unstressed condition at said predetermined temperature; and
(c) allowing said plastic material to set to form a race for said inner bearing member.

11. The method of manufacturing a bearing assembly having an inner bearing member and an outer rigid, undeformed plastic housing with an opening extending therethrough wherein the difference between the outer dimension of said inner bearing member and the cross-sectional dimension of said opening provides a minimum amount of clearance permitting filling thereof with a plastic material in unstressed condition, comprising the steps of:
(a) molding said outer housing with said opening therein;
(b) placing said inner bearing member within said opening in spaced relationship therewith;
(c) admitting a heated, liquefied, low shrink plastic material into the clearance between said inner bearing member and said housing at a predetermined temperature sufficient to liquefy said plastic and fuse it to the wall surface of said opening and at a pressure just sufficient to fill said clearance with said plastic in a substantially unstressed condition at said predetermined temperature; and
(d) allowing said plastic to set to form a race for said inner bearing member.

12. The method of manufacturing a bearing assembly as set forth in claim 11 wherein:
(a) said inner bearing member is provided with an outer bearing surface which defines part of a sphere;
(b) said opening in said housing is formed with a cylindrically shaped wall surface;
(c) said housing is formed with a filling orifice extending therethrough and into said opening; and
(d) said plastic material is admitted into said clearance through said filling orifice to fill said clearance and at least a portion of said filling orifice.

References Cited by the Examiner

UNITED STATES PATENTS

| 2,759,244 | 8/1956 | Heim | 29—159.5 |
| 2,932,081 | 4/1960 | Witte. | |
| 2,970,869 | 2/1961 | Thomas | 308—238 |
| 2,995,813 | 8/1961 | Board | 308—72 |

DAVID J. WILLIAMOWSKY, *Primary Examiner.*

FRANK SUSKO, *Examiner.*

UNITED STATES PATENT OFFICE
CERTIFICATE OF CORRECTION

Patent No. 3,287,071

November 22, 1966

William S. Tucker

It is hereby certified that error appears in the above numbered patent requiring correction and that the said Letters Patent should read as corrected below.

Column 1, line 36, for "pastic" read -- plastic --; line 49, for "theh" read -- the --; line 55, for "severly" read -- severely --; column 2, line 1, for "proventing" read -- preventing --; column 3, line 6, for "teaching" read -- teachings --; lines 45 and 46, for "embodiment" read -- embodiments --; column 4, line 46, after "inner" insert -- bearing --; line 55, after "40" insert -- % --; same line 55, for "40", in bold face type, read -- 40 --, in light face type; column 8, line 1, after "placing" insert -- said --.

Signed and sealed this 12th day of September 1967.

(SEAL)
Attest:

ERNEST W. SWIDER
Attesting Officer

EDWARD J. BRENNER
Commissioner of Patents